(12) United States Patent
Knowlton

(10) Patent No.: US 12,545,700 B2
(45) Date of Patent: Feb. 10, 2026

(54) EXCITONIC QUANTUM COMPUTING VIA AGGREGATE-AGGREGATE COUPLING

(71) Applicant: Boise State University, Boise, ID (US)

(72) Inventor: William B. Knowlton, Boise, ID (US)

(73) Assignee: Boise State University, Boise, ID (US)

( * ) Notice: Subject to any disclaimer, the term of this patent is extended or adjusted under 35 U.S.C. 154(b) by 1366 days.

(21) Appl. No.: 17/249,159

(22) Filed: Feb. 22, 2021

(65) Prior Publication Data

US 2023/0147320 A1 May 11, 2023

Related U.S. Application Data

(60) Provisional application No. 62/979,569, filed on Feb. 21, 2020.

(51) Int. Cl.
| | |
|---|---|
| *C07H 21/04* | (2006.01) |
| *C07H 21/02* | (2006.01) |
| *C09B 11/08* | (2006.01) |
| *C09B 23/06* | (2006.01) |
| *C09B 23/08* | (2006.01) |
| *G06N 3/123* | (2023.01) |
| *G06N 10/20* | (2022.01) |

(52) U.S. Cl.
CPC ............. *C07H 21/04* (2013.01); *C07H 21/02* (2013.01); *C09B 11/08* (2013.01); *C09B 23/06* (2013.01); *C09B 23/083* (2013.01); *G06N 3/123* (2013.01); *G06N 10/20* (2022.01); *Y10S 977/796* (2013.01)

(58) Field of Classification Search
CPC ......... C07H 21/04; C07H 21/02; C09B 11/08; C09B 23/06; C09B 23/083; G06N 3/123; G06N 10/00
See application file for complete search history.

(56) References Cited

U.S. PATENT DOCUMENTS

| | | |
|---|---|---|
| 9,073,962 B2 | 7/2015 | Fracchia et al. |
| 2015/0218204 A1 | 8/2015 | Yin et al. |
| 2017/0190573 A1 | 7/2017 | Shen et al. |
| 2018/0044372 A1 | 2/2018 | Han et al. |
| 2019/0048036 A1* | 2/2019 | Yurke ............... G06N 3/123 |

FOREIGN PATENT DOCUMENTS

WO     2014018675 A1     1/2014

OTHER PUBLICATIONS

Cannon et al., "Coherent Exciton Delocalization in a Two-State DNA-Templated Dye Aggregate System", Journal of Physical Chemistry A, vol. 121, pp. 6905-6916, Aug. 16, 2017.
(Continued)

*Primary Examiner* — Jezia Riley
(74) *Attorney, Agent, or Firm* — McKee, Voorhees & Sease, PLC

(57) ABSTRACT

Using nucleotide architectures to very closely and precisely place chromophores on a nucleic acid template to form dye aggregates that produce quantum coherent excitons, biexcitons, and triexcitons upon excitement to create excitonic quantum wires, switching, and gates that would then form the basis of quantum computation. Creating the various excitons and controlling the timing of the excitons would be performed using light of the corresponding wavelength and polarization to stimulate the corresponding chromophores.

27 Claims, 9 Drawing Sheets

(56) References Cited

OTHER PUBLICATIONS

Cannon et al., "Large Davydov Splitting and Strong Fluorescence Suppression: An Investigation of Exciton Delocalization in DNA-Templated Holliday Junction Dye Aggregates", Journal of Physical Chemistry A, vol. 122, pp. 2086-2095, Feb. 8, 2018.
Cannon et al., "Large Davydov Splitting and Strong Fluorescence Suppression: An Investigation of Exciton Delocalization in DNA-Templated Holliday Junction Dye Aggregates", Supporting Information, 20 pages, Feb. 8, 2018.
Childs et al., "Universal Computation by Multiparticle Quantum Walk", Science Mag., vol. 339, pp. 791-794, Feb. 15, 2013.
Gerling et al., "Sequence-programmable covalent bonding of designed DNA assemblies", Science Advances, vol. 4, 11 pages, Aug. 17, 2018.
Gerling et al., "Reversible Covalent Stabilization of Stacking Contacts in DNA Assemblies", Angew. Chem. Int. Ed., vol. 58, 6 pages, 2019.
Ke et al., "Three-Dimensional Structures Self-Assembled from DNA Bricks", Science, vol. 338(6111), 16 pages, Nov. 30, 2012.
Wei et al., "Complex shapes self-assembled from single-stranded DNA tiles", Nature, vol. 485, pp. 623-627, May 31, 2012.
Yan et al., "Directed nucleation assembly of DNA tile complexes for barcode-patterned lattices", PNAS, vol. 100, No. 14, pp. 8103-8108, Jul. 8, 2003.
Yurke et al., "Passive linear nanoscale optical and molecular electronics device systhesis from nanoparticles", Physical Review A, vol. 81, 9 pages, 2010.
Castellanos et al., "On the Design of Molecular Excitonic Circuits for Quantum Computing: The Universal Quantum Gates", Phys. Chem. Chem. Phys., vol. 22, pp. 3048-3057, 2020.

\* cited by examiner

EXCITONIC QUANTUM COMPUTING VIA AGGREGATE-AGGREGATE COUPLING

CROSS-REFERENCE TO RELATED APPLICATIONS

This application claims priority to U.S. Provisional Application having Ser. No. 62/979,569, filed Feb. 21, 2020, which is incorporated herein by reference in its entirety.

GOVERNMENT SUPPORT CLAUSE

This invention was made with government support under Award Number DE-SC0020089, awarded by the U.S. Department of Energy; Award Number 1648655, awarded by NSF INSPIRE ECCS; and Award Number N00014-19-1-2615, awarded by the Office of Naval Research. The government has certain rights in the invention.

FILED OF THE INVENTION

The invention relates generally to quantum computing. More specifically, the invention relates to chromophores bound to a nucleotide oligomer architecture which form into chromophore aggregates, which are used to propagate excitons down wires or through gates comprised of a series of aggregates for use in quantum calculations.

BACKGROUND OF THE INVENTION

An exciton is the name for the energy packet that resides on a chromophore when it is in its excited state. When two molecules are very close to each other such that the transition dipole-dipole coupling is weak to strong, the energy of an excited chromophore can be transferred to a neighboring chromophore without energy loss (coherent energy transfer), in contrast to the usual Förster resonance energy transfer (FRET) where the dipole-dipole coupling is very weak and energy loss occurs in the transfer (incoherent energy transfer). The packet of energy can be exchanged in a wave like manner back and forth between the two molecules. The energy packet, in this sense, acts like a quantum mechanical particle that can become delocalized or spread out over an aggregate of chromophores just like an electron can spread out its wave function over an entire molecule (molecular orbital). The Davydov splitting and the circular dichroism (CD) spectra seen in chromophore aggregates is a manifestation of this delocalization. Davydov splitting is analogous to the splitting of orbitals into bonding and antibonding orbitals when two atoms are brought close together. Similarly to passing the exciton from chromophore to chromophore, aggregates may also be used to pass an exciton from aggregate to aggregate.

Exciton wires can be made by first closely spacing chromophores, so they tightly couple together to form aggregates, and then to space aggregates together in weaker couplings. As discussed above, when aggregates are spaced appropriately, an exciton may transfer from one aggregate to another without the loss of energy. An exciton created in one chromophore in an aggregate at one end of the row of aggregates may propagate down the row, hopping from one aggregate to the next. This is done in a wavelike manner.

Exciton circuits made from these exciton wires may be made to be analogous to electronic circuits but where excitons carry the signals rather than electrons in classical computing. By bringing two exciton wires sufficiently close to each other an exciton can hop from one wire to the other by transferring from one aggregate to another. By doing this carefully one can make devices that function as signal dividers. The division ratio depends on rates with which excitons can be transferred between aggregates in the moderate to weak coupling region. The transfer rate depends on the spacing between the aggregates and their orientations. This dependence on spacing and orientation enables the construction of signal dividers with, for practical purposes, any division ratio. An exciton propagating down one exciton wire will become delocalized so that one must think of the exciton as being in a superposition state where it resides on both exciton wires. This device is a basis-change gate. Its function is analogous to that of an optical beam splitter or microwave directional coupler. A basis-change gate is one of the fundamental quantum gates.

Another quantum gate of fundamental importance is a phase-shift gate. The phase accumulated by an exciton is proportional to the distance it travels. Hence, a phase-shift gate can be made by engineering the wire so that the exciton travels over to have the length needed to accumulate the proper amount of phase. The phase an exciton accumulates is also determined by its energy relative to the optical transition energy for the aggregate. The optical transition frequency here denotes the energy difference between the aggregate's ground electronic state and its lowest excited electronic state that has an allowed optical transition. Hence, phase shifters can also be fashioned choosing the aggregates of differing optical transition energies. It is also possible to make phase shifters by terminating two ports of a signal divider with aggregates having differing optical transition energies.

Another quantum gate of fundamental importance is a controlled basis change gate. In contrast to the gates already discussed, which rely on wave interference effects, a controlled basis change gate relies on the interaction between two excitons. When two excitons reside on neighboring aggregates, they feel each other's presence just like two electrons will feel each other's Coulomb repulsion when they are brought close together. The two exciton interaction arises from static Coulomb interactions between aggregates and is most strong when the molecules have an asymmetric structure. Asymmetric structures possess a permanent electric dipole which changes sign when the molecule is excited from the ground state to the excited state. The static Coulomb interaction, in this case is a dipole-dipole interaction which, when both aggregates are excited (the two exciton case), differs in sign from the case when only one aggregate is excited (the one exciton case). Due to the static Coulomb interactions between aggregates one exciton will accumulate extra phase in the presence of the other exciton. As a result, the presence or absence of one exciton can control how the other exciton moves through a basis change gate.

These three types of gates, the basis-change gate, the phase-shift gate, and the controlled basis-change gate, form a complete set if the phase-shift gates can be produced with a finite set of phase angles. Since the phase angles can be controlled by the exciton path length, the optical transition energies of the phase-shifter wire aggregates or through the construction of optical phase-shifter gates out of basis-change gates with selected ports terminated this last requirement can be met. With this finite set of gates, one can assemble exciton circuits that perform any quantum computation. A set of gates having this property is said to be capable of universal quantum computation. This is analogous to the electronic computer case where the NAND gate is a universal gate in that any Boolean function can be implemented by a circuit employing only NAND gates.

It is possible to perform universal quantum computation with just basis-change gates and phase-shift gates, but the number of parts (gates) one needs grows exponentially with the size of the problem. So, doing quantum computation this way performs as well as classical computers. By introducing basis-change gates one can drastically reduce the parts count so that much fewer parts are required than for a classical computer. The controlled basis-change gate enables the entanglement of many-body (many-exciton) states so that a network of quantum gates acts as if it is performing many different computations simultaneously. This is similar to an n bit memory register. In a classical computer each memory element of the register can be in either a zero or a one state but not both simultaneously. In contrast a quantum mechanical register can be in a state that is a quantum mechanical superposition of being in the zero state and the one state. An n bit quantum memory in this sense can act as if it is holding 2n bits of information whereas the classical computer memory only holds n bits of information. A single controlled basis change gate excepting as inputs the contents of memory elements i and j and delivering the outputs back to memory elements i and j can update the amplitudes of all of the 2n states in the superposition of the memory register simultaneously. This is quantum parallelism.

Not all math problems are known to benefit from quantum speedup, but several classes of problems are known where quantum computers can vastly outperform classical computers. Two of the problems are factoring and database searching.

However, chromophores and aggregates exhibit many non-ideal characteristics for quantum computing. The electronic degrees of freedom are strongly coupled to the vibrational and environmental degrees of freedom. This causes phase jitter, which causes phase error to grow with time, thus spoiling the interference effects that the quantum gates relay on. All quantum computers suffer from this problem to a greater or lesser extent. Chromophores and aggregates thereof are also difficult to arrange in the requisite configurations.

What exciton quantum computers have in their favor is fast switching time, compact size (the components are relatively small molecules), and possible room temperature operation. Since photons are readily converted into excitons and excitons are readily converted into photons, it is noted that the above excitonic devices may find application in optical information processing, apart from quantum computing, as more compact embodiments of the currently employed optical phase shifters, signal dividers, and switches, employing Kerr nonlinearities, that have the functionality of controlled basis change gates. For these applications the performance requirements are less demanding than that for quantum computation.

BRIEF SUMMARY OF THE INVENTION

Applicants have created compositions of one or more aggregates of two or more chromophores attached to a nucleotide architecture. When two or more chromophores are spaced close enough to form a moderate to large dipole-dipole coupling, they form an aggregate. When aggregates are placed in moderate to weak coupling, an exciton may be transferred from one aggregate to another without energy loss within the nucleotide-templated aggregate architecture, they can propagate excitons down quantum wires and through quantum circuits, which can be used in quantum computing. The use of aggregates in quantum computing has several benefits over traditional methods, including functioning in a noisy environment and being able to be performed at room temperatures. The use of the nucleotide architecture allows for self-assembly of complex structures which place the chromophores and aggregates thereof in precise locations as well as placing the chromophores and aggregates sufficiently close to each other to allow for the transfer of excitons without energy loss, while preventing all of the chromophores to merely form a single aggregate by controlling the amount of coupling between chromophores and aggregates. Further, the use of nucleotides has benefits over the use of proteins for an architecture due to having less complex design rules.

In an embodiment, chromophores are attached to a nucleotide architecture to make aggregates, which then form exciton wires. In further embodiments, the nucleotide architecture configures the exciton wires into gates or switches. These gates or switches include, but are not limited to, basis gates, phase gates, controlled basis gates, Hadamard gates, momentum switches, and C$\theta$ gates. In yet further embodiments, the switches and gates are configured into exciton circuits. These wires, gates, switches, and circuits can then be used in quantum computing to solve mathematical problems, as well as sorting and querying problems.

In other embodiments, to answer a problem being calculated by a quantum circuit, the exciton wires are initialization by exciting only a subset of the aggregates, the input aggregate, to start the propagation of excitons through the rest of the aggregates within the quantum circuit. In further embodiments, the aggregate orientations are chosen and exposed to polarized light in such a manner that only the desired subset of aggregates is excited when the system is hit with an initializing pulse of light. In other embodiments, the input aggregates are initialized by lasers. In some embodiments, the readout of the circuit, containing the results of the calculation, can be done by using fluorescent reporter dyes delivered by Förster resonance energy transfer (FRET).

In the embodiments the nucleotide architecture is self-assembling. In some embodiments, the nucleotide architecture is double stranded. In yet other embodiments, the nucleotide architecture is single stranded. In another embodiment, to allow the attachment of additional chromophores and aggregates thereof when compared to a single stranded architecture, the nucleotide architecture is double stranded. In some embodiments the nucleotide architecture is linear for fast transmission speed down a wire or to allow fine tuning by reagents. In other embodiments, the nucleotide architecture is two- or three-dimensional to allow for more complex circuits or to increase rigidity of the chromophores within the architecture. In other embodiments, the nucleotide strands comprising the architecture may be branched to allow for increased complexity of the structure. In further embodiments, the nucleotide strands are configured by nucleotide origami. In other further embodiments, the nucleotide strands are configured into nucleotide bricks allowing for very complex and controlled three-dimensional structures.

While multiple embodiments are disclosed, still other embodiments of the present invention will become apparent to those skilled in the art from the following detailed descriptions, which show and describe illustrative embodiments of the invention. Accordingly, the figures and detailed description are to be regarded as illustrative in nature and not restrictive.

DETAILED DESCRIPTION

Figure 1A:
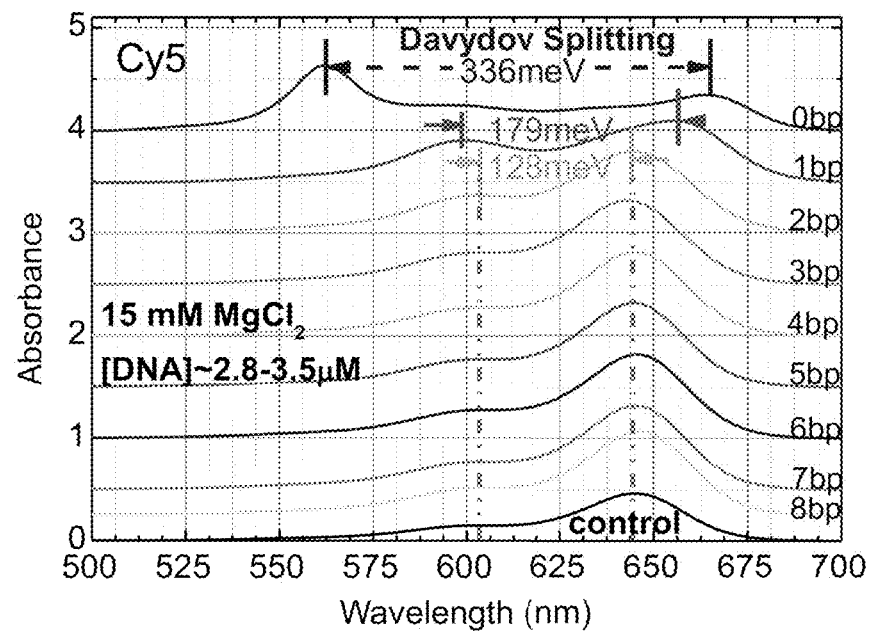
FIG. 1A is a graphical representation of changes in absorbance verses wavelength as a function of chromophores of Cy5 dimer separation examined by varying the number of nucleotides between monomers.

Unless otherwise defined herein, scientific and technical terms used in connection with the invention shall have the meanings that are commonly understood by those of ordinary skill in the art. Further, unless otherwise required by context, singular terms shall include the plural and plural terms shall include the singular. Generally, nomenclatures used in connection with, and techniques of, biochemistry, enzymology, molecular and cellular biology, microbiology, genetics and protein and nucleic acid chemistry and hybridization described herein are those well-known and commonly used in the art. The methods and techniques are generally performed according to conventional methods well known in the art and as described in various general and more specific references that are cited and discussed throughout the present specification unless otherwise indicated.

Definitions

The following terms, unless otherwise indicated, shall be understood to have the following meanings:

It should be noted that, as used in this specification and the appended claims, the singular forms "a," "an," "said," "another," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾. This applies regardless of the breadth of the range.

Other than in the operating examples, or where otherwise indicated, all numbers expressing quantities of ingredients or reaction conditions used herein are to be understood as being modified in all instances by the term "about".

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about," the claims include equivalents to the quantities.

"Non-covalent" refers to any molecular interactions that are not covalent—i.e. the interaction does not involve the sharing of electrons. The term includes, for example, electrostatic, π-effects, van der Waals forces, and hydrophobic effects. "Covalent" refers to interactions involving the sharing of one or more electrons.

As used herein, a "brick" is a structural unit. A brick may be of any shape or size. The main body of a brick may be of any material composition. An example of a brick is a "nucleotide brick," which is a structural unit where the body of the brick is made of a nucleotide oligomer. An example of a nucleotide brick is a "DNA brick," which is a nucleotide brick where the body of the brick is made of a DNA oligomer.

As used herein, a "nucleotide" is any nucleoside linked to a phosphate group. The nucleoside may be natural, including but not limited to, any of cytidine, uridine, adenosine, guanosine, thymidine, inosine (hypoxanthine), or uric acid; or synthetic, including but not limited to methyl-substituted phenol analogs, hydrophobic base analogs, purine/pyrimidine mimics, icoC, isoG, thymidine analogs, fluorescent base analogs, or X or Y synthetic bases. Alternatively, a nucleotide may be abasic, such as but not limited to 3-hydroxy hydroxymethyl-tetrahydrofuran, which act as a linker group lacking a base or be a nucleotide analog.

As used herein, "nucleotide duplex" is when two strands of complement nucleotide oligomers complementary bind to each other. The two strands may be part of the same nucleotide molecule or separate nucleotide molecules.

As used herein, "nucleotide origami" is two or more nucleotide bricks, where one brick is a "scaffold" and provides the main body of the overall structure and is bound by one or more "staple(s)."

As used herein, a "scaffold" is a single stranded nucleotide brick rationally-designed to self-assemble into hairpin loops, helical domains, and locking domains. The scaffold may use staples to direct the folding and to hold the final shape. Alternatively, the scaffold may use intrinsic self-complementary pairing to hold the final shape. Also alternatively, double crossover (DX) tiles may direct the folding of the scaffold.

As used herein, a "staple" or "staple strand" is a nucleotide brick which pairs with a longer main body brick in nucleotide origami to help fold the main body brick into the desired shape.

As used herein, a "nanobreadboard," "breadboard," or "template" is a total or final structure of a DNA structure or shape. For example, a mobile or immobile 4-arm junction, DNA origami happy face, rectangular brick, or double stranded DNA (dsDNA) in its final structure.

As used herein, an "architecture" is a one-, two-, or three-dimensional structure built using one or more bricks. As used herein, a "nucleotide architecture" is a one-, two-, or three-dimensional structure built using one or more nucleotide bricks. Examples include nucleotide origami or molecular canvases.

As used herein, "self-assembly" refers to the ability of nucleotides to adhere to each other, in a sequence-specific manner, in a predicted manner and without external control.

As used herein, "sufficiently close" and "nanospaced" refers to a distance between two chromophores that allows one chromophore, when excited, to emit an exciton and transfer the exciton to a second chromophore without a loss of energy.

As used herein, a "breadboard" refers to reusable solderless device used to build an exitonic circuit. The breadboard allows for temporary placement of different solutions, such as solutions containing chromophore bound nucleotide architectures, in different arrangements.

As used herein, Förster resonance energy transfer (FRET), fluorescence resonance energy transfer (FRET), resonance energy transfer (RET), or electronic energy transfer (EET) refers to energy transfer between two light-sensitive molecules (donor and acceptor chromophores) or aggregates thereof.

As used herein, the terms "dye aggregate," "chromophore aggregate," or "aggregate" are used interchangeably.

As used herein, the term "chromophore" may be used interchangeable with "fluorophore."

Nucleotide Architecture

Nucleotide nanotechnology can be used to form complicated one-, two-, and three-dimensional architectures. The nucleotide architectures may comprise of one or more nucleotide bricks. The nucleotide bricks are designed to use the Watson-Crick pairing of the nucleotides to cause the bricks to self-assemble into the final and predictable architectures. Any method of designing the architectures and self-assembly may be used, such as but not limited to nucleotide origami, nucleotide brick molecular canvases, single stranded tile techniques, or any other method of nucleotide folding or nanoassembly such as, but not limited to, using nucleotide tiles, nucleotide scaffolds, nucleotide lattices, four-armed junction, double-crossover structures, nanotubes, static nucleotide structures, dynamically changeable nucleotide structures, or any other synthetic biology technique (as described in U.S. Pat. No. 9,073,962, U.S. Pub. No.: US 2017/0190573, U.S. Pub. No.: US 2015/0218204, U.S. Pub. No.: US 2018/0044372, or International Publication Number WO 2014/018675, each of which is incorporated in its entirety by reference).

The nucleobase making up the bricks may be natural, including but not limited to, any of cytosine, uracil, adenine, guanine, thymine, hypoxanthine, or uric acid; or synthetic, including but not limited to methyl-substituted phenol analogs, hydrophobic base analogs, purine/pyrimidine mimics, icoC, isoG, thymidine analogs, fluorescent base analogs, or X or Y synthetic bases. Alternatively, a nucleotide may be abasic, such as but not limited to 3-hydroxy-2-hydroxymethyl-tetrahydrofuran, or alternatively a nucleotide analog may be used.

Non-limiting examples of synthetic nucleobases and analogs include, but are not limited to methyl-substituted phenyl analogs, such as but not limited to mono-, di-, tri-, or tatramethylated benzene analogs; 3-cyanovinylcarbazole (cnv) modified bases; hydrophobic base analogs, such as but not limited to 7-propynyl isocarbostyril nucleoside, isocarbostyril nucleoside, 3-methylnapthalene, azaindole, bromo phenyl derivates at positions 2, 3, and 4, cyano derivatives at positions 2, 3, and 4, and fluoro derivates at position 2 and 3; purine/pyrimidine mimics, such as but not limited to azole hetercyclic carboxamides, such as but not limited to (1H)-1,2,3-triazole-4-carboxamide, 1,2,4-triazole-3-carboxamide, 1,2,3-triazole-4-carboxamide, or 1,2-pyrazole-3-carboxamide, or heteroatom-containing purine mimics, such as furo or theino pyridiones, such as but not limited to furo[2,3-c]pyridin-7(6H)-one, thieno[2,3-c]pyridin-7(6H)-one, furo[2,3-c]pyridin-7-thiol, furo[3,2-c]pyridin-4(5H)-one, thieno[3,2-c]pyridin-4(5H)-one, or furo[3,2-c]pyridin-4-thiol, or other mimics, such as but not limited to 5-phenyl-indolyl, 5-nitro-indolyl, 5-fluoro, 5-amino, 4-methylbenzimidazole, 6H,8H-3,4-dihydropropyrimido[4,5-c][1,2]oxazin-7-one, or $N^6$-methoxy-2,6-diaminopurine; isocytosine, isoquanosine; thymidine analogs, such as but not limited to 5-methylisocytosine, difluorotoluene, 3-toluene-1-β-D-deoxyriboside, 2,4-difluoro-5-toluene-1-β-D-deoxyriboside, 2,4-dichloro-5-toluene-1-β-D-deoxyriboside, 2,4-dibromo-5-toluene-1-β-D-deoxyriboside, 2,4-diiodo-5-toluene-1-β-D-deoxyriboside, 2-thiothymidine, 4-Se-thymidine; or fluorescent base analogs, such as but not limited to 2-aminopurine, 1,3-diaza-2-oxophenothiazine, 1,3-diaza-2-oxophenoxazine, pyrrolo-dC and derivatives, 3-MI, 6-MI, 6-MAP, or furan-modified bases.

Non-limiting examples of nucleotide analogs include, but are not limited to, phosporothioate nucleotides, 2'-O-methyl ribonucleotides, 2'-O-methoxy-ethyl ribonucleotides, peptide nucleotides (PNA), N3'-P5' phosphoroamidate, 2'-fluoro-arabino nucleotides, locked nucleotides (LNA), unlocked nucleotides (UNA), bridge nucleotides (BNA), morpholino phosphoroamidate, cyclohexene nucleotides, tricyclo-deoxynucleotides, or triazole-linked nucleotides.

The nucleotides can then be polymerized into oligomers. The design of the oligomers will depend on the design of the final architecture. Simple architectures may be designed by any methods. However, more complex architectures may be design using software such as, but not limited to, caDNAno (as described at http://cadnano.org/docs.html, and herein incorporated by reference), to minimize errors and time. The user may input the desired shape of the architecture into the software and once finalized, the software will provide the oligomer sequences of the bricks to create the desired architecture.

In addition to using nucleotide analogs, such as LNA or BNA, to increase the rigidity of the nucleotides, crosslinking may also be used to increase the rigidity of oligomers. Without being bound by a particular theory, the crosslinking, resulting in at least one covalent bond between at least two nucleotides, of the oligomers may prevent the strands from being forced apart by large aggregates as a covalent bond is stronger than the hydrogen bonding between bases. Crosslinking may be done within a strand, for example between two adjacent bases on the same strand, or between two or more strands, for example if two thymidine bases are opposite of each other when two strands are aligned. If nucleotide architecture forms adjacent nucleotide helixes, such as in nucleotide origami, crosslinking may be done intraduplex or interduplex. Crosslinking may be preformed using any known means to the art using a number of different compounds. For example, the compounds may include, but are not limited to, nitrogen mustards, cisplatin, carmustine, mitomycin C, psorlen, aldehydes, and/or nitrous acid. Additionally, oxidative stress or radiation, such as UV radiation, may be used to form the cross links.

In a preferred embodiment, nucleotides are crosslinked on opposite strands by crosslinking thymidine or thymidine analogs (for example see Gerling T., et al., Sequence-programmable covalent bonding of designed DNA assemblies, *Sci. Adv.*, 2018; 4:eaau1157, herein incorporated by reference in its entirety). The nucleotide architecture is designed so that thymidine or thymidine analogs are on opposite strands or on different brick within the nucleotide architecture when the strands or bricks are annealed or folded and form cyclobutene thymidine dimers due to UV radiation exposure. The thymidine or thymidine analogs may designed be a terminal base, interhelical, or within a loop and may be the same or different to the thymidine or thymidine analog on the opposite strand. For example, when the nucleotide architecture is a nucleotide origami comprising bricks, the thymidine or thymidine analogs may be placed terminally, in a half cross-over, in a full crossover, or within loops opposite any of a terminally, half-crossover, full crossover, or loop on the opposite strand when the origami is folded. After folding, the nucleotide architecture is exposed to UV radiation for a sufficient time for crosslinking to occur. Any UV wavelength may be used, including UVA, from about 315 to about 400 nm, UVB, from about 280 to about 315 nm, or UVC, from about 100 to about 280 nm, preferably UVB. One skilled in the art will appreciate that the time of exposure will vary depending on the wattage of the UV source, the wavelength of UV used, the amount of crosslinking desired, and the concentration and volume of the nucleotide architecture. For example, the nucleotide architecture may be exposed to 300-watt UV source filtered for exposure to UVB at about 310 nm for about 1 second, for about 5 seconds, for about 10 seconds, for about 30 seconds, for about 1 minute, for about 2 minutes, for about 5 minutes, for about 10 minutes, for about 15 minutes, for about 20 minutes, for about 30 minutes, for about 45 minutes, for about 60 minutes, or more. Optionally, the nucleotide architecture may be exposed for about 1 second to about 180 minutes, from about 5 seconds to about 150 minutes, from about 10 seconds to about 140 minutes, or from about 10 seconds to about 120 minutes. The amount of adjacent thymidine or thymidine analogs crosslinked may be about 1%, about 5%, about 10%, about 15%, about 20%, about 25%, about 30%, about 35%, about 40%, about 45%, about 50%, about 55%, about 60%, about 65%, about 70%, about 75%, or more, or from about 1% to about 80%, from about 5% to about 75%, from about 10% to about 75%, or from about 15% to about 75%.

In another preferred embodiment, the crosslinks are reversable though a [2+2]-cycloaddition reaction induced by UVA radiation (see for example Gerling T. and Dietz, H., Reversible Covalent Stabilization of Stacking Contacts in DNA Assemblies, *Angew. Chem. Int. Ed.*, 2019, 58, 1-6, herein incorporated by reference in its entirety). This type of cross link is similar to the thymidine-thymidine crosslinking described above and the nucleotide architecture may be designed using the same considerations. However, by modifying a nucleobase with 3-cyanovinylcarbazole ($^{CNV}K$), the modified nucleobase may form a crosslink with an adjacent pyrimidine base, for example the next or previous base along the strand or on a strand that is aligned with the modified base. The pyrimidine base may be on the same or different strand. $^{CNV}K$-thymidine crosslinks may be formed by exposing the nucleotides to UVA radiation from about 360 nm to about 370 nm and may be reversed by exposing the crosslink to UVB radiation from about 305 nm to about 315 nm. To help facilitate crosslinking, salt concentration and/or temperature may be changed. To help facilitate crosslinking the ionic strength can be increased or the temperature lowered. A high ionic strength buffer, for example, contains from about 20 mM $MgCl_2$ to about 40 mM $MgCl_2$, or from about 25 mM $MgCl_2$ to about 35 mM $MgCl_2$ or from about 27.5 mM $MgCl_2$ to about 32.5 mM $MgCl_2$. A low ionic strength buffer, for example, contains from about 1 mM $MgCl_2$ to about 10 mM $MgCl_2$, from about 2.5 mM $MgCl_2$ to about 7.5 mM $MgCl_2$ or from about 4 mM $MgCl_2$ to about 6 mM $MgCl_2$. By altering the ionic strength of the buffer by changing the salt concentrations it is believed that the position of $^{CNV}K$ changes from a closed to open position. However, without radiation, no crosslinks will either form or be cleaved. One skilled in the art will appreciate that the time of exposure will vary depending on the wattage of the UV source, the wavelength of UV used, the amount of crosslinking desired, and the concentration and volume of the nucleotide architecture. For example, the nucleotide architecture may be exposed to 300-watt UV source filtered for exposure to UVA at about 365 nm to form crosslinks or UVB at about 310 nm to cleave crosslinks for about 1 second, for about 5 seconds, for about 10 seconds, for about 30 seconds, for about 1 minute, for about 2 minutes, for about 5 minutes, for about 10 minutes, for about 15 minutes, for about 20 minutes, for about 30 minutes, for about 45 minutes, for about 60 minutes, or more. Optionally, the nucleotide architecture may be exposed for about 1 second to about 180 minutes, from about 5 seconds to about 150 minutes, from about 10 seconds to about 140 minutes, or from about 10 seconds to about 120 minutes. The amount of adjacent thymidine or thymidine analogs crosslinked may be about 1%, about 5%, about 10%, about 15%, about 20%, about 25%, about 30%, about 35%, about 40%, about 45%, about 50%, about 55%, about 60%, about 65%, about 70%, about 75%, or more, or from about 1% to about 80%, from about 5% to about 75%, from about 10% to about 75%, or from about 15% to about 75%.

In some embodiments the architecture is comprised of nucleotide brick molecular canvases, wherein the canvases are made of 1 to 5,000 nucleotide bricks comprising of nucleotide oligomers of 24 to 48 nucleotides and will self-assemble in a single reaction, a "single-pot" synthesis, as described in U.S. Pub. No.: US 2015/0218204. In more preferable embodiments, the canvases are made of 1 to 1,000 nucleotide bricks, from 1 to 750 nucleotide bricks, from 1 to 500 nucleotide bricks, or from 1 to 250 nucleotide bricks. In other embodiments, the oligomers comprise of 24 to 42 nucleotides, from 24 to 36 nucleotides, or from 26 to 36 nucleotides.

In another embodiment the architecture is made step wise using a serial fluidic flow to build the final shape as described in U.S. Pat. No. 9,073,962.

In some embodiments, the architecture is assembled using the origami approach. With a DNA origami approach, for example, a long scaffold nucleic acid strand is folded to a predesigned shape through interactions with relatively shorter staple strands or double crossover (DX) tiles as described in Hao, Y., et al., Directed nucleation assembly of DNA tile complexes for barcode-patterned lattices, *PNAS*, 2003, 100(14):8103-8108 (herein incorporated by reference in its entirety). Thus, in some embodiments, a single-stranded nucleic acid for assembly of a nucleic acid nanostructure has a length of at least 500 base pairs, at least 1 kilobase, at least 2 kilobases, at least 3 kilobases, at least 4 kilobases, at least 5 kilobases, at least 6 kilobases, at least 7 kilobases, at least 8 kilobases, at least 9 kilobases, or at least 10 kilobases. In some embodiments, a single-stranded nucleic acid for assembly of a nucleic acid nanostructure has a length of 500 base pairs to 10 kilobases, or more. In some embodiments, a single-stranded nucleic acid for assembly of a nucleic acid nanostructure has a length of 7 to 8 kilobases. In some embodiments, a single-stranded nucleic acid for assembly of a nucleic acid nanostructure comprises the M13 viral genome. In some embodiments the number of staple strands is less than about 500 staple strands or DX tiles, less than about 400 staple strands or DX tiles, less than about 300 staple strands or DX tiles, less than about 200 staple strands or DX tiles, or less than about 100 staple strands or DX tiles.

In some embodiments, the architecture is assembled from single-stranded tiles (SSTs) (see, e.g., Wei B. et al. Nature 485: 626, 2012, incorporated by reference herein) or nucleic acid "bricks" (see, e.g., Ke Y. et al. Science 388:1177, 2012; International Publication Number WO 2014/018675 A1 each of which is incorporated by reference herein). For example, single-stranded 2- or 4-domain oligonucleotides self-assemble, through sequence-specific annealing, into two- and/or three-dimensional nanostructures in a predetermined (e.g., predicted) manner. As a result, the position of each oligonucleotide in the nanostructure is known. In this way, a nucleic acid nanostructure may be modified, for example, by adding, removing or replacing oligonucleotides at particular positions. The nanostructure may also be modified, for example, by attachment of moieties, at particular positions. This may be accomplished by using a modified oligonucleotide as a starting material or by modifying a particular oligonucleotide after the nanostructure is formed. Therefore, knowing the position of each of the starting oligonucleotides in the resultant nanostructure provides addressability to the nanostructure.

In some embodiments, the architecture is made from a single stranded oligomer, as described in U.S. Pub. No.: 2018/0044372 and herein incorporated by reference. A single strand of DNA used for assembling a nanostructure in accordance with the present disclosure may vary in length. In some embodiments, a single strand of DNA has a length of 500 nucleotides to 10,000 nucleotides, or more. For example, a single strand of DNA may have a length of 500 to 9000 nucleotides, 500 to 8000 nucleotides, 500 to 7000 nucleotides, 500 to 6000 nucleotides, 500 to 5000 nucleotides, 500 to 4000 nucleotides, 500 to 3000 nucleotides, 500 to 2000 nucleotides, 500 to 1000 nucleotides, 1000 to 10000 nucleotides, 1000 to 9000 nucleotides, 1000 to 8000 nucleotides, 1000 to 7000 nucleotides, 1000 to 6000 nucleotides, 1000 to 5000 nucleotides, 1000 to 4000 nucleotides, 1000 to 3000 nucleotides, 1000 to 2000 nucleotides, 2000 to 10000 nucleotides, 2000 to 9000 nucleotides, 2000 to 8000 nucleotides, 2000 to 7000 nucleotides, 2000 to 6000 nucleotides, 2000 to 5000 nucleotides, 2000 to 4000 nucleotides, or 2000 to 3000 nucleotides. In some embodiments, a single strand of DNA may have a length of at least 2000 nucleotides, at least 3000 nucleotides, at least 4000 nucleotides, or at least 5000 nucleotides. In some embodiments, a single strand of DNA may have a length of 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3100, 3200, 3300, 3400, 3500, 3600, 3700, 3800, 3900, 4100, 4200, 4300, 4400, 4500, 4600, 4700, 4800, 4900, 5100, 5200, 5300, 5400, 5500, 5600, 5700, 5800, 5900, 6600, 6200, 6300, 6400, 6500, 6600, 6700, 6800, 6900, 7100, 7200, 7300, 7400, 7500, 7600, 7700, 7800, 7900, 8100, 8200, 8300, 8400, 8500, 8600, 8700, 8800, 8900, 9100, 9200, 9300, 9400, 9500, 9600, 9700, 9800, 9900, or 10000 nucleotides.

In some embodiments, the architecture is two-dimensional and comprises a single layer of bricks or a single scaffold. The single layer of bricks may form a molecular canvas. In other embodiments, the architecture is three-dimensional and may contain 2, 3, 4, 5, 6, 7, 8, 9, 10, 20, 30, or more layers of two-dimensional structures depending on the desired final shape. In some embodiments, the architecture is attached to a substrate, such as a glass slide, a silicon base, or a breadboard.

In other embodiments, the architecture remains in a solution. By altering aspects of the solution, such as but not limited to pH, salt concentrations, and cation charge, the aggregation of the bricks may be changed, which may change the orientation, as well as the absorbance spectra, of the chromophores.

Chromophores

Using the above architectures, chromophores may be placed in precise distances from each other. At sufficiently short distances on these architectures, two or more chromophores may become weakly, moderately or strongly coupled and may form an aggregate. When chromophores aggregate in high concentrations in solution, coherent exciton delocalization behavior (e.g. large Davydov splitting, exchange narrowing, circular dichroism, Cotton effects, or Stokes shifting) can be observed.

Any chromophore that emits an exciton when excited is acceptable and may be used in any embodiment. A chromophore may be symmetrical or preferably asymmetrical and may have additional modifications to change solubility, hydrophobicity, or symmetry in order to adjust the placement of the chromophore. By way of non-limiting examples, the chromophore may be one or more of a commercial chromophore(s), such as but not limited to Freedom™ Dye, Alexa Fluor® Dye, LI-COR IRDyes®, ATTO™ Dyes, Rhodamine Dyes, or WellRED Dyes; or any other dye. Examples of Freedom™ Dyes include 6-FAM, 6-FAM (Fluorescein), Fluorescein dT, Cy3 ™, TAMRA™, JOE, Cy5™, TAMRA, MAX, TET™, Cy5.5™, ROX, TYE™ 563, Yakima Yellow®, HEX, TEX 615, TYE™ 665, TYE 705, and Dyomic Dyes. Examples of Alexa Fluor® Dyes include Alexa Fluor® 488, 532, 546, 647, 660, and 750. Examples of LI-COR IRDyes® include 5' IRDye® 700, 800, and 800CW. Examples of ATTO™ Dyes include ATTO™ 488, 532, 550, 565, Rho101, 590, 633, 647N. Examples of Rhodamine Dyes include Rhodamine Green™-X, Rhodamine Red™-X, and 5-TAMRA™. Examples of WellREd Dyes include WellRED D4, D3, and D2. Examples of Dyomic Dyes include Dy-530, -547, -547P1, -548, -549, -549P1, -550, -554, -555, -556, -560, -590, -591, -594, -605, -610, -615, -630, -631, -632, -633, -634, -635, -636, -647, -647P1, -648, -648P1, -649, -649P1, -650, -651, -652, -654, -675, -676, -677, -678, -679P1, -680, -681, -682, -700, -701, -703, -704, -705, 730, -731, -732, -734, -749, -749P1, -750, -751, -752, 754, -756, -757, -758, -780, -781, -782, -800, -831, -480XL, -481XL, -485XL, -510XL, -511XL, -520XL, -521XL, -601XL. Examples of other dyes include 6-FAM, Fluorescein, Texas Red®-X, and Lightcycler® 640.

In some embodiments, the chromophores are bound to the 5' ends of the nucleotide bricks. In other embodiments, the chromophores are bound to the 3' ends of the nucleotide bricks. In yet other embodiments, the chromophores are bound internally within the nucleotide bricks. In still more embodiments, the chromophores are bound to any mix of 5' ends, 3' ends, or internally. The position of the chromophore will depend on the desired final configuration. Methods of binding chromophores to nucleotides is well known in the art.

In some embodiments, the chromophores are bound to the same nucleotide duplex. In other embodiments, the chromophores are bound to separate nucleotide duplexes.

In some embodiments some of the chromophores are covalently bound to the bricks while other of the chromophores are bound to separate oligomers, a linker nucleotide oligomer, and the linker oligomers then Watson-Crick pair with exposed single strands of the bricks.

Dye Aggregates

When two or more chromophores are place sufficiently close to each other to couple, they may form an aggregate. The stronger the coupling within the aggregate, the greater the peak shift relative to the monomer or the greater the Davydov splitting will be. Aggregates have different properties than the chromophore which make up the aggregate as can be seen in the differences between the Hamiltonians between an aggregate and a chromophore.

The aggregate based excitonic quantum coherent effects may occur at room temperature in wet and noisy environments and the systems may be less than about 10 nm. These systems provide several large benefits over the currently available excitonic quantum coherent systems, which are much larger, measuring in the micrometer size, and required extreme operating conditions, such as cryogenic temperatures, external magnetic fields and/or large microwave pulses, and dry environments.

Using the above architectures, two or more chromophores may be bound to the nucleotides in order to be precisely placed so that the chromophores create tightly coupled aggregates. When so placed, the aggregates may produce quantum coherent excitons, biexcitons, and triexcitons when excited by a light source. In some exemplary embodiments, the two or more chromophores are covalently bound to the same nucleotides brick, and then the chromophore bound brick and any non-bound bricks are allowed to self-assemble into the desired final one-, two-, or three-dimensional shape. In another embodiment, the two or more chromophores are covalently bound to different nucleotide bricks and then the bricks are allowed to self-assemble into the desired final one-, two-, or three-dimensional shape. Another embodiment is combination thereof, in which some bricks have one while other bricks have multiple bound chromophores. The bricks once assembled place the chromophores within their aggregate.

In some embodiment, the bricks, which may already have bound chromophores, are allowed to first self-assemble into the desired final one-, two-, or three-dimensional shape. Portions of the bricks may still be unpaired after assembly, allowing for further binding of complementary oligomers. The two or more chromophores are bound to at least one complementary oligomer which may then pair with the one or more unpaired portions of the bricks.

The orientation of the two or more chromophore dipoles to each other may effect the absorbance and emission spectra of the aggregate. Depending on the orientation, a pair of chromophores nanospaced apart will have different characteristics when compared to the monomer chromophore. When the dipoles are parallel in the aggregate an "H-dimer" forms, which are characterized by a blue-shift in absorbance due to having a higher excited energy state when compared to the monomer. When the dipoles are in a head-to-head orientation in an aggregate, a "J-dimer" forms, which is characterized by a red-shift in absorbance due to having a lower excited energy state when compared to a monomer. When the dipoles are at an oblique angle in an aggregate, a mixed "J/H-dimer" forms and is characterized by Davydov splitting due to having both a higher and lower excited energy state when compared to a monomer (see Cannon et al., *Coherent Exciton Delocalization in a Two-State DNA-Templated Dye Aggregate System,* 2017, J. Phys. Chem. A, 121: 6905-6916, herein incorporated by reference).

As taught in U.S. patent application Ser. No. 16/100,052 (herein incorporated by reference in its entirety), the orientation of the chromophores within an aggregate on a linear oligomer, is also affected by characteristics of the solution, including salt concentration, temperature, and cation concentration. The orientation may affect the absorbance spectra. Therefore, by altering the conditions of the solution, it is possible to fine tune the absorbance spectra of the aggregates. For example, as the salt concentration increases, a dimer aggregate may be fine-tuned to exhibit either J-dimer characteristics at lower salt concentrations or H-dimer characteristics at high salt concentrations. Also, altering both the temperature and salt concentrations, it is further possible to tune the chromophores for specific characteristics as not only the absorbance, but the emission may be altered by changing the concentration of salt in the solution.

Additionally, the absorbance spectrum of the aggregates on a linear oligomer is also affected by the spacing of the chromophores comprising the aggregate. As the distance increases between the chromophores, coupling is decreased which is seen as the Davydov splitting disappears and the absorbance spectrum approaches that of the monomer. To have proper spacing, the chromophores within the aggregate must be tightly coupled, but to prevent two aggregates behaving as a single aggregate, an aggregate must be spaced so that they are only moderately or loosely coupled with another aggregate.

Taken together, by altering the composition of the solution surrounding the nucleotide architecture and by altering the distance between the chromophores and aggregates, one skilled in the art may alter the absorbance and emission spectra for an aggregate comprised of two or more chromophores bound to a nucleotide architecture.

In an embodiment an aggregate comprises at least two chromophores held by an architecture in a head to tail to form a J-dimer. In another embodiment an aggregate comprises at least two chromophores held by an architecture in parallel to form a H-dimer. In another embodiment the aggregate comprises at least two chromophores held oblique to each other by an architecture to form a mixed J/H-dimer.

In another embodiment, an aggregate comprises at least three chromophores are positioned within the architecture so that two of the three chromophores form a J-dimer, and two of the three chromophores form a H-dimer. In a different embodiment, an aggregate comprises chromophores positioned such that two form a J-dimer and the third forms two mixed J/H-dimers. In yet another embodiment, an aggregate comprises three chromophores with two chromophores forming a H-dimer and the third forms two mixed J/H-dimers.

In yet another embodiment, an aggregate comprises a tetramer of chromophores positioned within the architecture such that two H-dimers, two J-dimers are formed, and two mixed J/H-dimers form. In other embodiments, the tetramer can be position so that two H-dimers and four mixed J/H-dimers are formed. In yet another embodiment, the tetramer is positioned so that two J-dimers and four mixed J/H-dimers are formed.

In some embodiments, an aggregate comprises chromophores which all have the same optical transition energies. In other embodiments, the chromophores differ in their optical transition energies. The different optical transition energies allow the construction of a set phase shifter having desired values of absorbance and emittance.

In other embodiments, the basic configurations dimer, trimers, and tetramers as described above can be joined with other monomers, dimer, trimers, and tetramers in order to form more complex aggregates. An aggregate may comprise of any number of chromophores, for example an aggregate may comprise of 2 or more, 3 or more, 4 or more, 5 or more, 7 or more, 10 or more, or 15 or more chromophores. Preferably an aggregate may comprise from between 2 and 20 chromophores, from between 2 and 15 chromophores, from between 2 and 10 chromophores, or from between 3 and 5 chromophores.

Wires, Circuits, Gates, and Quantum Computing

Quantum algorithms enable the speed-up of computation tasks such as, but not limited to, factoring and sorting. These computations may be performed by an excitonic quantum computer. The excitonic quantum computer combining the aggregates, as discussed above, can be made into exciton coherence wires, circuits, and gates. By moderately or loosely coupling the aggregates, wires may be formed so that when a first aggregate, the "input aggregate," is excited and emits an exciton, the exciton passes, without loss of energy if sufficiently close, to a second aggregate. That aggregate may then pass the exciton to a third aggregate, and so on down a line of aggregates in a wave like manner. The wires may be straight or branched and may be shaped to go in any direction within the architecture. The architecture may contain one or more wires. Depending on the architecture system used, the wires may be formed along a single nucleotide brick, such as in using the scaffold strand of nucleotide origami, or multiple bricks may comprise the wire, such as in molecular canvases.

When two or more wires are brought sufficiently close to each other such that they are nanospaced, the exciton may transfer from one wire to the other. By controlling this transfer, it is possible to build quantum circuits and gates. Two basic gates are needed for universal quantum computing: basis-change gates and phase-shift gates. The basis-change gate function as a signal divider in classical computer. As the exciton propagates down one wire and if another wire is sufficient close, the exciton will delocalize and enter a superposition state where it resides on both wires.

The phase-shift gate alters the excitons phase by controlling the distance the exciton travels along the two wires. This may be done by first bringing two wires within nanospace from each other and then bending one or more wire away from the other in order to create two different lengths of the wires before bringing the wires close again.

However, with just these two types of gates, quantum computing does not outperform classical computing. A third kind of gate, the controlled basis-change gate enables the entanglement of many-exciton states so that a network of quantum gates as if it is performing many different computations simultaneously. An exemplary controlled basis-change gate may be made from two basis-change gates and a phase-shift gate, with the phase-shift gate between the two basis-change gates. The controlled basis-change gate relies on the interaction between two excitons. When two excitons reside on neighboring aggregates, they feel each other's presence just like two electrons will feel each other's Coulomb repulsion when they are brought close together. The two exciton interaction arises from static Coulomb interactions between molecules and is stronger when the molecules have an asymmetric molecular structure than those with a symmetrical molecular structure. Asymmetric molecules possess a permanent electric dipole which changes sign when the molecule is excited from the ground state to the excited state. The static Coulomb interaction, in this case is a dipole-dipole interaction which, when both aggregates are excited (the two exciton case), differs in sign from the case when only one aggregate is excited (the one exciton case). Due to the static Coulomb interactions between aggregates one exciton will accumulate extra phase in the presence of the other exciton. As a result, the presence or absence of one exciton can control of the other exciton moves through a basis change gate.

Additionally, additional gates may be incorporated into the architecture, such as, but not limited to, Hadamard gates, momentum switches, and C$\theta$ gates (see Childs et al., *Universal Computation by Multiparticle Quantum Walk*, Science, 339, 791-94 (2013), herein incorporated by reference).

Using the DNA architecture to control the positioning of the aggregates and the wide range of chromophores with different optical transition energies, the phase-shift gates can be controlled to only have a finite set of phase angles. By controlling the position and optical transition energies of the various gates, a set of gates, or a quantum circuit.

The wires, gates, and switches as discussed above can be joined together to answer questions that benefit from quantum algorithms such as, but not limited to, sorting, factoring, and database searching. To initialize the system, input aggregate(s) are excited by using the light with the proper wavelength and polarization in such a manner that only the desired subset of aggregate(s) is excited when the system is hit with an initializing pulse of light. The wavelength and degree of polarization of the light may match that of input aggregate(s) in order to excite the aggregate(s) and cause exciton emission. Any light source that may produce the wavelength used by the aggregate may be used, such as, but not limited to, lasers, including ultra-fast lasers.

After initializing, the excitons then propagate from aggregate to aggregate along the wires into the various gates. The various gates than calculate the answer, such as a sorted list or mathematical problem. The output, or readout, can be done by using fluorescent reporter dyes to which the answer of the quantum computation is delivered by FRET. While this would be particularly beneficial for problems in which the output has a limited number of bits, these problems have applications in aeronautics, Earth and space sciences, and space exploration, among other fields of research. Additionally, these systems because it demonstrates that quantum coherence is observed at room temperature in a wet and noisy environment, an environment that is normally hostile to quantum coherence.

In an embodiment, the aggregates and nucleotide architecture forms a single gate or switch. In other embodiments, the aggregates and nucleotide architecture forms multiple gates and/or switches.

In other embodiments, multiple aggregates and nucleotide architectures, each comprising of one or more gate and/or switch, are aligned to form more complex circuits. The aligned architectures may be aligned using light or exciton wires to move the result of a quantum computation from one architecture to another. In a further embodiment, the multiple architectures may be aligned by placement upon a breadboard. Using this alignment allows to the output of one architecture to provide the input for a second architecture along the complex circuit.

The disclosures of each and every patent, patent application, and publication cited herein are hereby incorporated herein by reference in their entirety.

The invention is further described in detail by reference to the following experimental examples. These examples are provided for purposes of illustration only and are not intended to be limiting unless otherwise specified. Thus, the invention should in no way be construed as being limited to the following examples, but rather, should be construed to encompass any and all variations which become evident as a result of the teaching provided herein.

EXAMPLES

Example 1

To determine the effect of separation on the absorbance spectrum and coupling of chromophores, the number of nucleotides to which the chromophores were bound along a linear oligomer were varied for different dyes.

Figure 1B:
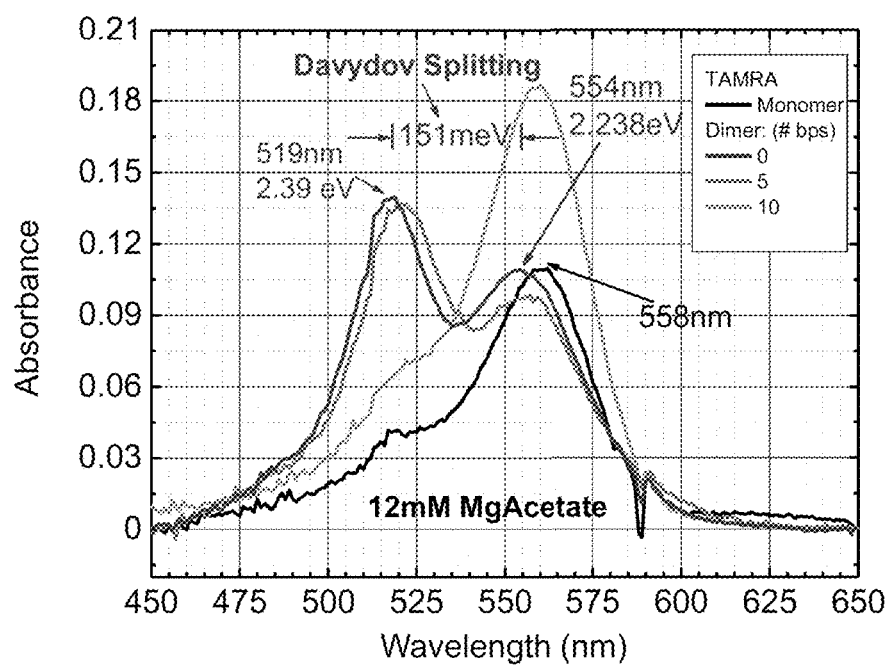
FIG. 1B is a graphical representation of changes in absorbance verses wavelength as a function of chromophores of TAMRA dimer separation examined by varying the number of nucleotides between monomers.

As shown in in FIG. 1A, two Cy5 chromophores were bound from 0 to 8 nucleotides apart on a double stranded DNA oligomer and keeping the salt concentration of the solution at 15 mM $MgCl_2$. As shown, as the distance increased the absorbance spectrum of the Cy5 chromophores exhibited dimer characteristics, as evidenced by the Davydov splitting, at close distances, when the attachment points are about 2 nucleotides (bp) or less. At 3 nucleotides and more the Cy5 chromophores exhibited monomer characteristics. In contrast, TAMRA chromophores in a 12 mM MgAcetate solution showed dimer characteristics when the attachment points to the DNA were spaced further apart from each other, maintaining dimer characteristics at least until 5 nucleotides apart (FIG. 1B). The dimerization characteristics for TAMRA was lost at 10 nucleotides as measured by the change in absorbance spectrum.

Therefore, to maintain dimer characteristics, the individual chromophore molecules must remain near each other or they will act like monomers.

Example 2

Figure 2A:
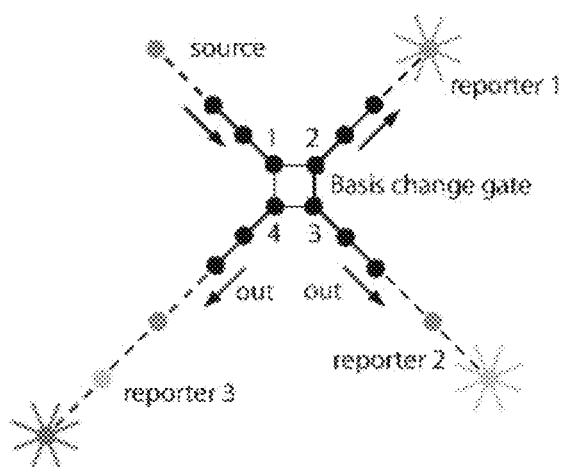
FIG. 2A is a schematic representation of an exemplary basis change gate with three reporters where the solid black line represents a nucleic acid and the circles each represent a separate aggregate.
Figure 2B:
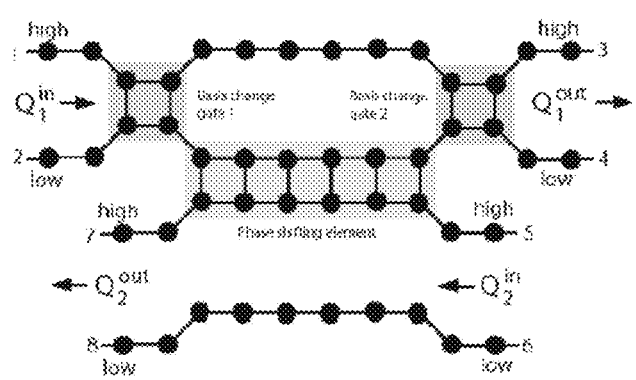
FIG. 2B is a schematic representation multiple gates, including basis change gates and a phase gate where the solid black line represents a nucleic acid and the circles each represent a separate aggregate.
Figure 3A:
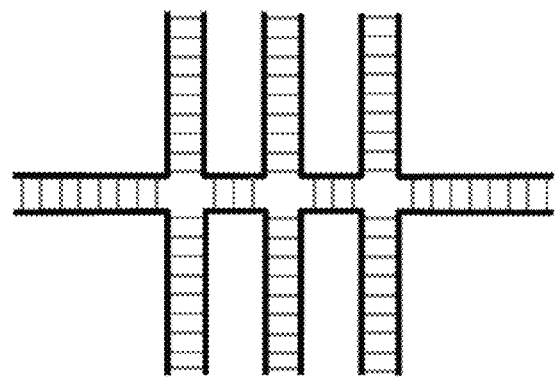
FIG. 3A shows an exemplary multi-four-way nucleic acid (Holiday) junction having three junctions and without any chromophores bound.
Figure 3B:
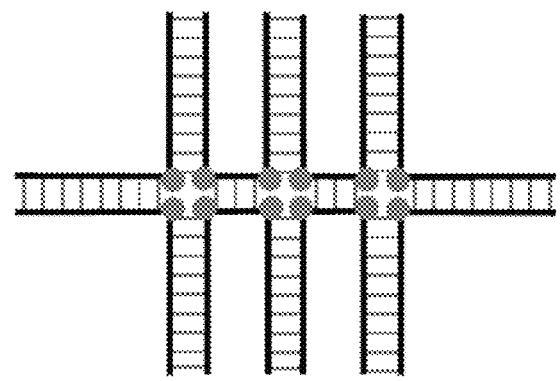
FIG. 3B shows that dye aggregates, for example tetramers, may be formed by binding a chromophore to each of the corner of the central space and that multiple Holliday junctions may be used to align the aggregates in a linear fashion.
Figure 3C:
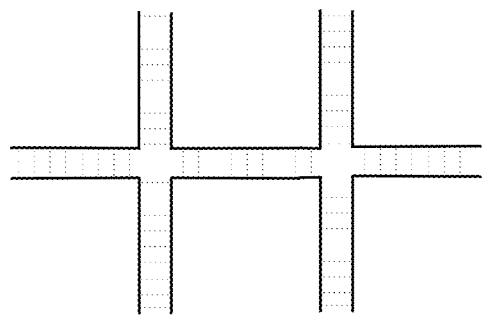
FIG. 3C shows an exemplary multi-Holiday junction having two junctions without any chromophores bound.
Figure 3D:
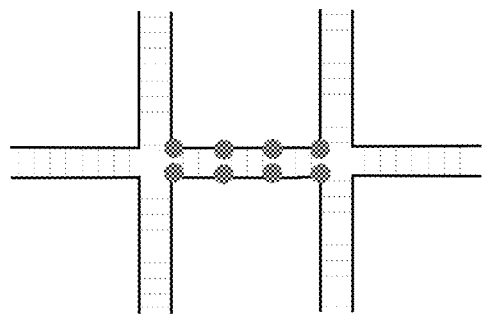
FIG. 3D shows dimer aggregates placed starting at the junctions and along the nucleotide strands connecting the junctions.

By attaching the chromophores to nucleic acids in desired positions, aggregates may be formed, and then the aggregates may be built into the desired wires and gates. Chromophores may be placed close enough to form moderate to large dipole-dipole coupling to form an aggregate, as displayed by the black dots in FIGS. 2A-B. The aggregates may then be placed far from each other to form moderate to weak dipole-dipole coupling between aggregates whereby the distance between aggregates is represented by the black lines in FIGS. 2A-B. The different gates used for quantum computing may be formed in a variety of ways. For example, as shown in FIG. 2A, the aggregates may be arranged in such a way as to form a basis change gate capable of directing an input into one or more reporters. FIG. 2B shows an integration of the basis change gate, along with a phase shifting element and a wire, to form a more complex circuit.

The gates and wires may be formed, for example, by attaching the chromophores to Holliday junctions (see FIGS. 3A-D) or using more complex structures, such as those created using bricks (see FIGS. 4A-E). As shown in FIGS. 3A-D the open region of the Holliday junction may be used to form an aggregate of chromophores where the dots, or node, represent aggregates. These aggregates may then be spaced by varying the number of nucleotides between the Holliday junctions to form wires.

Figure 4A:
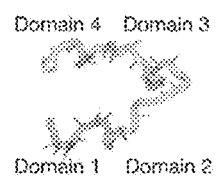
FIG. 4A shows a nucleotide brick comprising four domains which may be used to self-assemble into the exemplary complex structures.
Figure 4B:
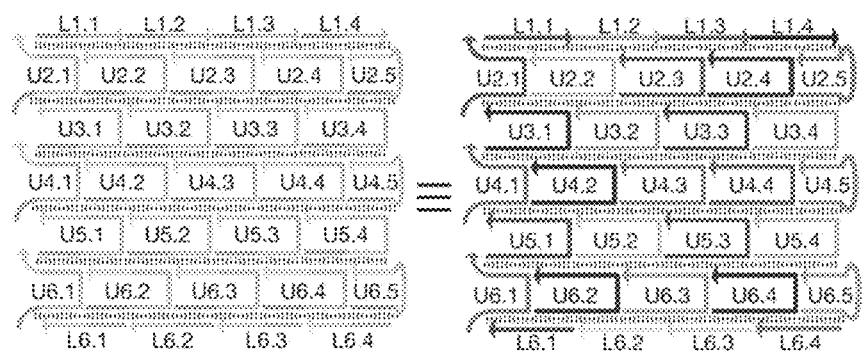
FIG. 4B shows exemplary self-assembled bricks into complex structures.
Figure 4C:
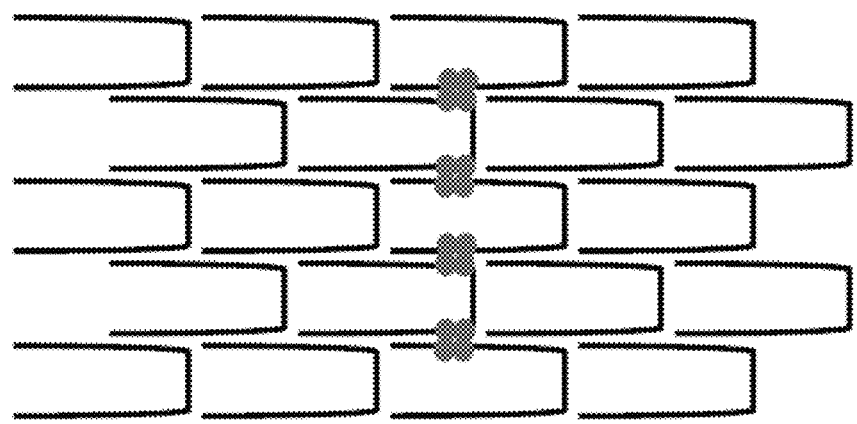
FIG. 4C shows the chromophores bound to the internal regions of the bricks brought together to form a wire of aggregates.
Figure 4D:
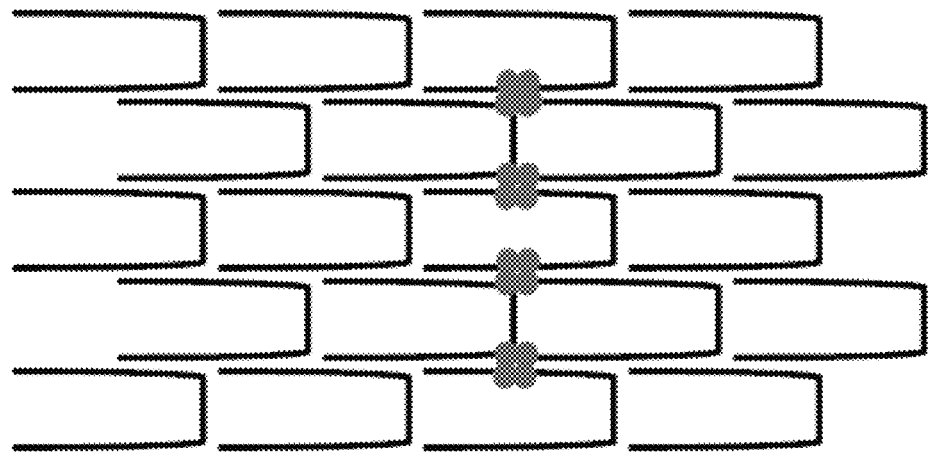
FIG. 4D shows the chromophores bound both to the ends and to the internal regions of the bricks brought together to form a wire of aggregates.
Figure 4E:
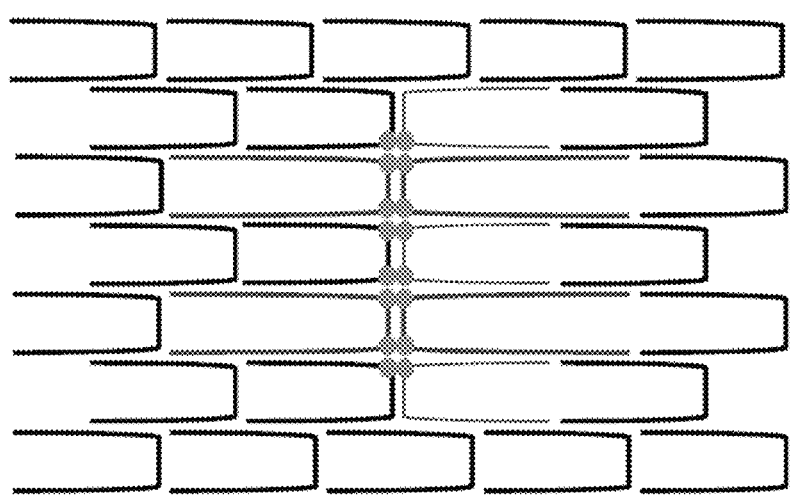
FIG. 4E shows a modified brick structure with the chromophores bound to the internal regions of the bricks brought together to form a wire of aggregates.

Also, as shown in FIGS. 4A-E, bricks of nucleic acids may be used to form more complex structures based on aggregates. As shown in FIG. 4B, the bricks may be used to form more complex structures than the Holliday junctions. Chromophores may be attached to the bricks so that they form aggregates which are depicted by the dots (FIGS. 4C-E). The placement of the chromophores may be either all internal to the bricks (FIGS. 4C and 4E) or the ends may also be used (FIG. 4D). The complex structure of the assembled bricks may be used to distance the aggregates so that only a weak dipole-dipole coupling is achieved instead of the moderate to large dipole-dipole coupling of the aggregates. Further, as shown in FIGS. 4C and 4E, the bricks may be modified to form a variety of shapes.

Additionally, it would be possible to use bricks to form the Holliday junctions or for a series of Holliday junctions to be attached to an assembly of bricks.

Therefore, by using nucleic acids, chromophores may be placed sufficiently close to each other to form aggregates while simultaneously placing the aggregates sufficiently distant from each other to create the appropriate dipole-dipole coupling needed to form quantum wires, gates, and circuits.

Example 3

Due to the packing and size of the chromophores making up the aggregates, the nucleotide architectures may need additional stabilization. In addition to using more structurally stable LNA or BNA backbones the architecture may be designed to include thymidine or $^{CNV}K$ modified bases in specific location to allow for crosslinking to form covalent bonds within or between strands.

Figure 5A:
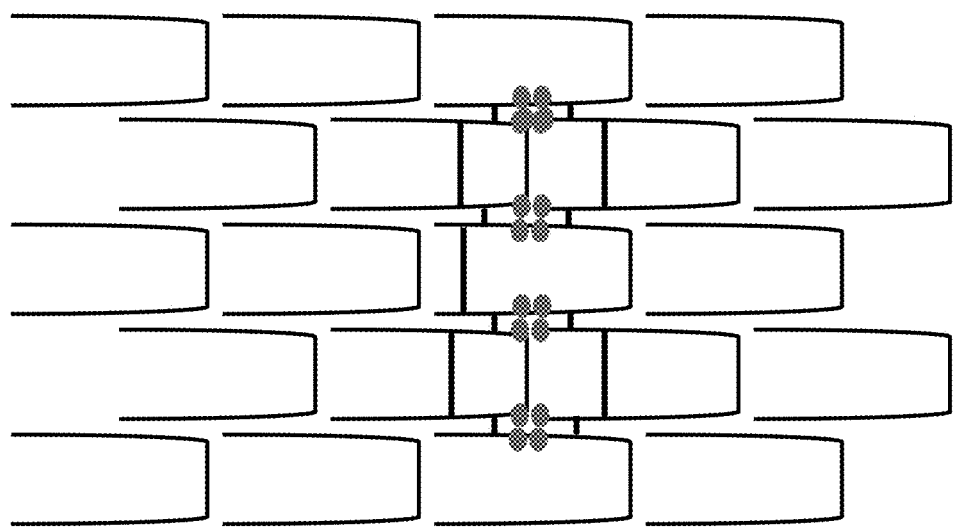
FIG. 5A shows an exemplary crosslinked nucleotide architecture, where the long lines within the bricks represent interduplex crosslinks and the short lines between bricks represent intraduplex crosslinks and chromophores are bound to the internal regions of the bricks.
Figure 5B:
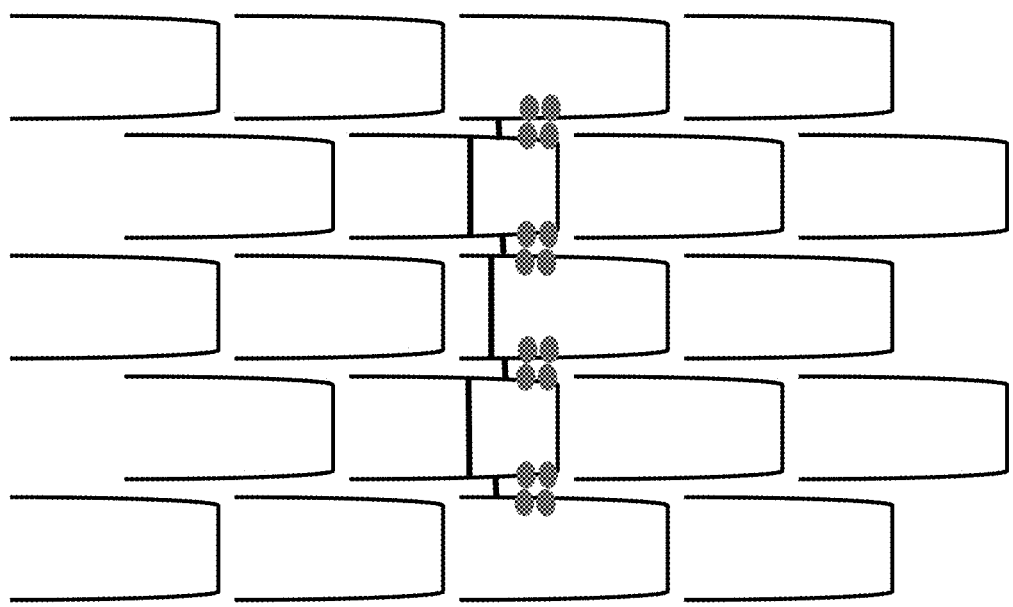
FIG. 5B shows an exemplary crosslinked nucleotide architecture, where the long lines within the bricks represent interduplex crosslinks and the short lines between bricks represent intraduplex crosslinks and chromophores are bound both to the end and internal regions of the bricks.
Figure 5C:
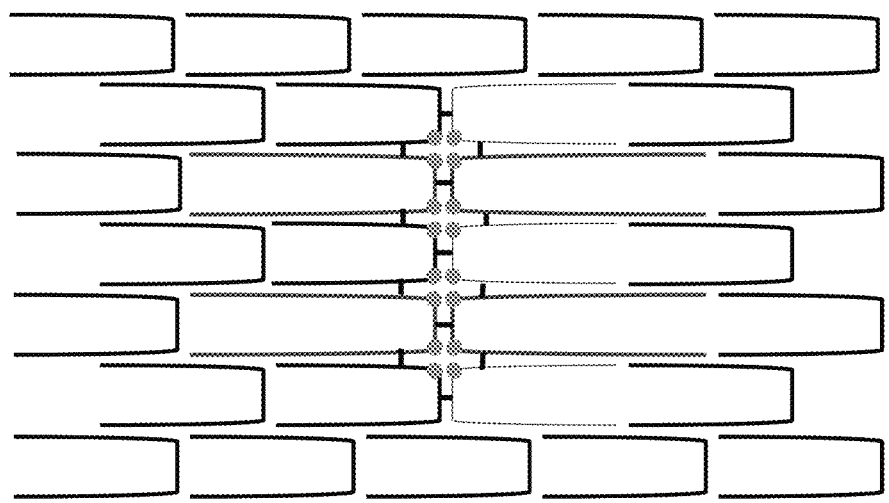
FIG. 5C shows a modified exemplary crosslinked nucleotide architecture, where the short lines between bricks represent intraduplex crosslinks and chromophores are bound both to the end and internal regions of the bricks.

As shown in FIGS. 5A-C, by placing thymidine or $^{CNV}K$ modified bases at specific positions near the chromophore aggregates, then exposing the aggregates to UVB or UBA radiation, respectively, various crosslinks may be formed to strengthen the nucleotide architecture. In addition to the brick structures shown in FIGS. 5A-C, any type of nucleotide architecture may be crosslinked, such as the Holliday structures shown in FIGS. 3A-C, or those discussed herein. This additional strengthening helps to better control the distance of the chromophores from each other to form the aggregates. It also helps to control the distance between the aggregates as well. This additional control over distance assists in creating the appropriate dipole-dipole coupling needed to form quantum wires, gates, and circuits.

What is claimed is:

1. A complex quantum circuit for quantum computing, comprising:
   at least two nucleotide brick molecular canvases, each comprising:
   a nucleotide brick; and
   at least two aggregates, each aggregate comprising of at least two tightly coupled chromophores and the aggregates are loosely coupled to another aggregate, wherein one or more of the chromophores within the aggregates are bound to internal regions of the nucleotide brick so as to form a wire of aggregates;
   wherein a first nucleotide brick molecular canvas of the at least two nucleotide brick molecular canvases is aligned and adjacent to a second nucleotide brick molecular canvas of the at least two nucleotide brick molecular canvases so that light emitted from said aggregates on said first nucleotide brick molecular canvas may be absorbed by the aggregates on the second nucleotide brick molecular canvas.

2. The complex quantum circuit of claim 1, wherein said at least two nucleotide brick molecular canvases each comprise between 1 and about 5,000 bricks.

3. The complex quantum circuit of claim 1, wherein said nucleotide bricks are made of RNA, DNA, LNA, PNA, BNA, and/or UNA, and/or a combination thereof and are about 24 to about 42 nucleotides in length.

4. The complex quantum circuit of claim 1, wherein one or more of said chromophores within said aggregates is asymmetrical.

5. The complex quantum circuit of claim 1, wherein one or more of the chromophores within the aggregate is a fluorescent dye, a fluorescent dye attachment, a fluorescent particle, a fluorescent compound, a fluorochrome, fluorescein, a chemical relative of fluorescein, a fluorophore, an ester and/or a combination thereof.

6. The complex quantum circuit of claim 1, wherein said nucleotide brick molecular canvases has a one-, two-, and/or three-dimensional sections, and/or combinations thereof.

7. The complex quantum circuit of claim 1, further comprising a linker nucleotide oligomer, wherein one or more of said chromophores within the aggregates is covalently bound to said linker nucleotide oligomer and wherein said linker nucleotide oligomer Watson-Crick pairs with said nucleotide brick within the nucleotide brick molecular canvas.

8. The complex quantum circuit of claim 1, further comprising an additional chromophore.

9. The complex quantum circuit of claim 8, wherein said aggregate is loosely coupled to said additional chromophore, another aggregate of two or more tightly coupled chromophores, and/or combinations thereof.

10. The complex quantum circuit of claim 1, wherein said nucleotide brick molecular canvases further comprises an exciton wires, an exciton gate, and/or an exciton switch, and/or a combinations thereof.

11. A complex quantum circuit for quantum computing, comprising:
    at least two nucleotide brick molecular canvases, each comprising:
    a nucleotide brick; and
    at least two aggregates, each aggregate comprising of at least two tightly coupled chromophores and the aggregates are loosely coupled to another aggregate, wherein one or more of the chromophores within the aggregates are bound to the nucleotide brick;
    wherein a first nucleotide brick molecular canvas of the at least two nucleotide brick molecular canvases is aligned and adjacent to a second nucleotide brick molecular canvas of the at least two nucleotide brick molecular canvases so that light emitted from said aggregates on said first nucleotide brick molecular canvas may be absorbed by the aggregates on the second nucleotide brick molecular canvas;
    wherein said first nucleotide brick molecular canvas is crosslinked to said second nucleotide brick molecular canvas.

12. A method of initiating the complex quantum circuit for quantum computing of claim 11, comprising:
    assembling said exciton circuit, wherein said exciton circuit self-assembles from a nucleotide brick molecular canvas, comprising:
    wherein one or more of said at least two aggregates is an input aggregate;
    exposing said input aggregate to light having a wavelength and polarization within the absorbance range for said polarization of said input chromophore.

13. The method of claim 12, wherein said nucleotide brick molecular canvas comprises between 1 and about 5,000 bricks.

14. The method of claim 12, wherein the bricks are made of RNA, DNA, BNA, LNA, PNA, and/or UNA, and/or combination thereof and are about 24 to about 42 nucleotides in length.

15. The method of claim 12, wherein one or more of said chromophores within said aggregate is asymmetrical.

16. The method of claim 12, wherein one or more of said chromophores within said aggregate is a fluorescent dye, a fluorescent dye attachment, a fluorescent particle, a fluorescent compound, a fluorochrome, fluorescein, a chemical relative of fluorescein, a fluorophore, an ester, and/or a combination thereof.

17. The method of claim 12, wherein said nucleotide brick molecular canvases has a one-, two-, and/or three-dimensional section, and/or combinations thereof.

18. The method of claim 12 further comprising a linker nucleotide oligomer, wherein one or more of the chromophores within the aggregates is covalently bound to said linker nucleotide oligomer and wherein said linker nucleotide oligomer Watson-Crick pairs with a brick within said nucleotide brick molecular canvas.

19. The method of claim 12, wherein said nucleotide brick molecular canvas is crosslinked.

20. A method of transferring an exciton within the complex quantum circuit for quantum computing of claim 11, comprising:
    exposing an input aggregate, comprised of the at least two tightly coupled chromophores, to a signal capable of releasing an exciton from said input aggregate,
    wherein said exciton is transferred to an acceptor, wherein said acceptor is a chromophore, an aggregate of two or more tightly coupled chromophores and/or combinations thereof, and loosely coupled to said input aggregate.

21. The method of claim 20, wherein said signal is an exciton.

22. The method of claim 20, wherein said signal is light having a wavelength and polarization within the absorbance range for said polarization of said input chromophore capable of releasing an exciton from said input aggregate.

23. The method of claim 20, wherein said exciton is propagated through an exciton wire.

24. The method of claim 20, wherein said exciton is propagated through a quantum circuit.

25. A complex quantum circuit for quantum computing, comprising:
   at least two nucleotide brick molecular canvases, each comprising:
      a nucleotide brick having an intraduplex crosslink; and
      at least two aggregates, each aggregate comprising of at least two tightly coupled chromophores and the aggregates are loosely coupled to another aggregate, wherein one or more of the chromophores within the aggregates are bound to the nucleotide brick;
   wherein a first nucleotide brick molecular canvas of the at least two nucleotide brick molecular canvases is aligned and adjacent to a second nucleotide brick molecular canvas of the at least two nucleotide brick molecular canvases so that light emitted from said aggregates on said first nucleotide brick molecular canvas may be absorbed by the aggregates on the second nucleotide brick molecular canvas.

26. A complex quantum circuit for quantum computing, comprising:
   at least two nucleotide brick molecular canvases, each comprising:
      a nucleotide brick;
      at least two aggregates, each aggregate comprising of at least two tightly coupled chromophores and the aggregates are loosely coupled to another aggregate, wherein one or more of the chromophores within the aggregates are bound to the nucleotide brick; and
   wherein a first nucleotide brick molecular canvas of the at least two nucleotide brick molecular canvases is aligned and adjacent to a second nucleotide brick molecular canvas of the at least two nucleotide brick molecular canvases so that light emitted from said aggregates on said first nucleotide brick molecular canvas may be absorbed by the aggregates on the second nucleotide brick molecular canvas; and
   an interduplex crosslink between the first nucleotide brick molecular canvas and the second nucleotide brick molecular canvas.

27. A complex quantum circuit for quantum computing, comprising:
   at least two nucleotide templates, each comprising:
      a DNA structural component selected from the group consisting of: (i) a nucleotide structure brick, (ii) a nucleotide origami, (iii) a double crossover (DX) tile, and (iv) a double stranded DNA (dsDNA); and
      at least two aggregates, each aggregate comprising of at least two tightly coupled chromophores and the aggregates are loosely coupled to another aggregate, wherein one or more of the chromophores within the aggregates are bound to the DNA structural component;
   wherein a first nucleotide template of the at least two nucleotide templates is aligned and adjacent to a second nucleotide template of the at least two nucleotide templates so that light emitted from said aggregates on said first nucleotide template may be absorbed by the aggregates on the second nucleotide template; and
   wherein a dipole-dipole coupling between each of the at least two aggregates is weaker than each dipole-dipole coupling within each aggregate of the at least two aggregates.

* * * * *